(12) United States Patent
Vereschagin (10) Patent No.: US 7,644,484 B2
(45) Date of Patent: Jan. 12, 2010

(54) METHOD OF MANUFACTURING A BAND WITH A FASTENER

(76) Inventor: Lawrence Wayne Vereschagin, 16017-88 Avenue, Edmonton, AB (CA) T5R 4M3

( * ) Notice: Subject to any disclaimer, the term of this patent is extended or adjusted under 35 U.S.C. 154(b) by 345 days.

(21) Appl. No.: 11/281,806

(22) Filed: Nov. 18, 2005

(65) Prior Publication Data

US 2006/0266230 A1 Nov. 30, 2006

(51) Int. Cl.
*B23P 11/00* (2006.01)
*B65D 63/02* (2006.01)

(52) U.S. Cl. .............................. 29/505; 29/509; 24/20 R (58) Field of Classification Search .................. 29/505, 29/509, 709, 712, 714, 715; 53/580, 582, 53/139.4, 138.1, 138.2; 24/20 R, 21, 22, 24/23 R, 23 EE, 265 R, 265 A; 140/93.2, 140/93.4, 151, 123.5, 123.6; 100/29, 30
See application file for complete search history.

(56) References Cited

U.S. PATENT DOCUMENTS

| | | | |
|---|---|---|---|
| 2,271,591 A | 2/1942 | Chak | |
| 2,781,516 A | 2/1957 | Eisenberg | |
| 3,041,962 A | 7/1962 | Workman | |
| 3,120,171 A | 2/1964 | Hall | |
| 5,146,847 A | 9/1992 | Lyon et al. | |
| 5,287,802 A | 2/1994 | Pearson | |
| 5,452,523 A * | 9/1995 | Jansen | 33/555.4 |
| 5,743,310 A * | 4/1998 | Moran | 140/123.6 |
| 6,014,792 A * | 1/2000 | Marelin et al. | 24/20 R |
| 6,782,679 B2 | 8/2004 | Helland et al. | |
| 7,089,970 B2 * | 8/2006 | Bernard | 140/123.6 |

FOREIGN PATENT DOCUMENTS

| | | | |
|---|---|---|---|
| EP | 1481910 | | 12/2004 |
| GB | 2079843 A | * | 1/1982 |
| GB | 2112846 A | * | 7/1983 |

\* cited by examiner

*Primary Examiner*—Jermie E Cozart (57) ABSTRACT

A device and method is disclosed for manufacturing a band of a desired length with a fastener attached to the band. Generally, metal band material is fed from a spindle on the device until the end of the band material is detected by the device. The device includes a positioning component that places the fastener at the desired location of the band, which is then looped through the fastener. The device then crimps the fastener to the band, positions the band at its desired length, and cuts the band to the desired length.

19 Claims, 6 Drawing Sheets

METHOD OF MANUFACTURING A BAND WITH A FASTENER

FIELD OF INVENTION

The present invention relates generally to banding systems, and more particularly to a device and method for automatically measuring, cutting and attaching a clip to a band.

BACKGROUND TO THE INVENTION

In the oil, gas and chemical refinery industries, there is a requirement for insulation to be wrapped around pipes. The insulation serves to conserve energy by limiting heat exchange with the surrounding atmosphere. The insulation is traditionally held in place with jacketing which protects the insulation from deterioration, and metal bands placed approximately every twelve inches along the length of the insulated pipe. A particular installation may require a million or more feet of pipe to be insulated. As the pipe diameters and insulation thickness may vary, there is no standard band length which can be produced in advance. Rather, bands must be measured and cut on site to meet the requirements of the particular installation.

There is a need for an automated apparatus and method for measuring and cutting a desired length of steel band and attaching a wing type seal clip to the hand for use as a pipe insulation retaining band.

It is known to provide a machine for automatically securing a band around a box or other object to be banded. Such devices are described in U.S. Pat. No. 2,781,516 to Eisenberg "Eisenberg", U.S. Pat. No. 3,120,171 to Hall et al "Hall" and U.S. Pat. No. 3,0491,962 to Workman "Workman". Eisenberg teaches a machine which nails a metal band to a box, but does not attach a clip to the band, and does not automatically measure and cut bands for later application to an object. Hall teaches a hydraulic machine for repeatedly wrapping a band about a box and sealing the band to itself. Workman describes a machine which wraps a band about an object in a controlled manner which will optimize energy expenditure.

It is known to provide a machine for measuring and cutting a band to a desired length, using a programmable controller which controls a system of rollers to feed and eject band supply and cut it to a desired length. Such a device is described in U.S. Pat. No. 5,287,802 to Pearson "Pearson". The device in Pearson does not attach a clip to one end of the band.

U.S. Pat. No. 5,146,847 to Lyon et al "Lyon" describes a band feed assembly which is capable of wrapping a band about an object using a drive wheel connected to a reversible drive motor. A controller permits control of the speed, direction, acceleration and tensioning of the band. Lyon does not attach a clip to the band.

It is known to provide a device for applying heat-sealable bands around objects including a programmable control system which receives signals from sensors in the machine to regulate the banding spelling cycle. An example of such a device is described in Canadian Patent No. 2,271,591 to Chak et al "Chak". Chak does not teach a method and apparatus for attaching a clip to a band of a desired length.

European Patent Application No. 1,481,901 to Sickel's describes a method and control system for a banding machine which permits determination of a foreign object in proximity to the machine and starting and stopping of the banding cycle in response.

It is also known to provide a control mechanism for a feed and tension unit in a banding apparatus. Such a mechanism is described in U.S. Pat. No. 6,782,679 to Helland et al "Helland". In Helland, a desired length of band can be measured and cut, however, no clip is attachable to the measured band.

DISCLOSURE OF INVENTION

It is an aspect of this invention to provide a machine for manufacturing a band of desired length having fastening means at one end thereof, said machine comprising spindle means for maintaining a spool of metal band material in proximity to the machine; feeding means for feeding and ejecting a metal strip material into the machine; end determination means for determining the location of the end of the band material; fastener placement means for positioning the fastener means; band folding means for bending the band about the fastener means; compressing means for compressing the band to the fastening means; cutting means for cutting a desired length of band; and control means for controlling the manufacturing process.

It is a further aspect of this invention to provide a method for preparing a band of a desired length having at clip at one end, the method comprising the steps of feeding the band into the machine and locating the end of band, withdrawing the band; inserting a clip into position; reinserting the band into the machine through a loop in the clip; bending the band around a loop of the clip; pulling the band back to engage the bent band with an edge of the clip; bending the band onto the loop; clip is about band; band is fed to desired length; and strap is cut to desired length.

It is a further aspect of this invention to provide a device for manufacturing a band of a selected length with fastening means at one end thereof comprising means for moving said band to said device; means for placing said fastener to said one end of said band; means for bending one end of said band around said fastener; means for cutting a desired length of said band so as to produce said band of selected length with a fastener at one end thereof.

It is yet another aspect of this invention to provide a method of manufacturing a band of a selected length with a fastener at one end thereof comprising moving said band to said device; placing said fastener to said one end on said band bending said one end of said band around said fastener; cutting a desired length of said band.

It is a further aspect of this invention to provide a strap for wrapping around a conduit comprising a selected length of band material having a first and second end; a clip having a channel therethrough for receiving one end of said band therethrough, said one end of said band bent about said clip so as to retain said clip at said one end; said other end of said band adapted to wrap around said conduit whereby said other end of said band is adapted to be received by said channel and crimped to said clip and said other end.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Figure 1:
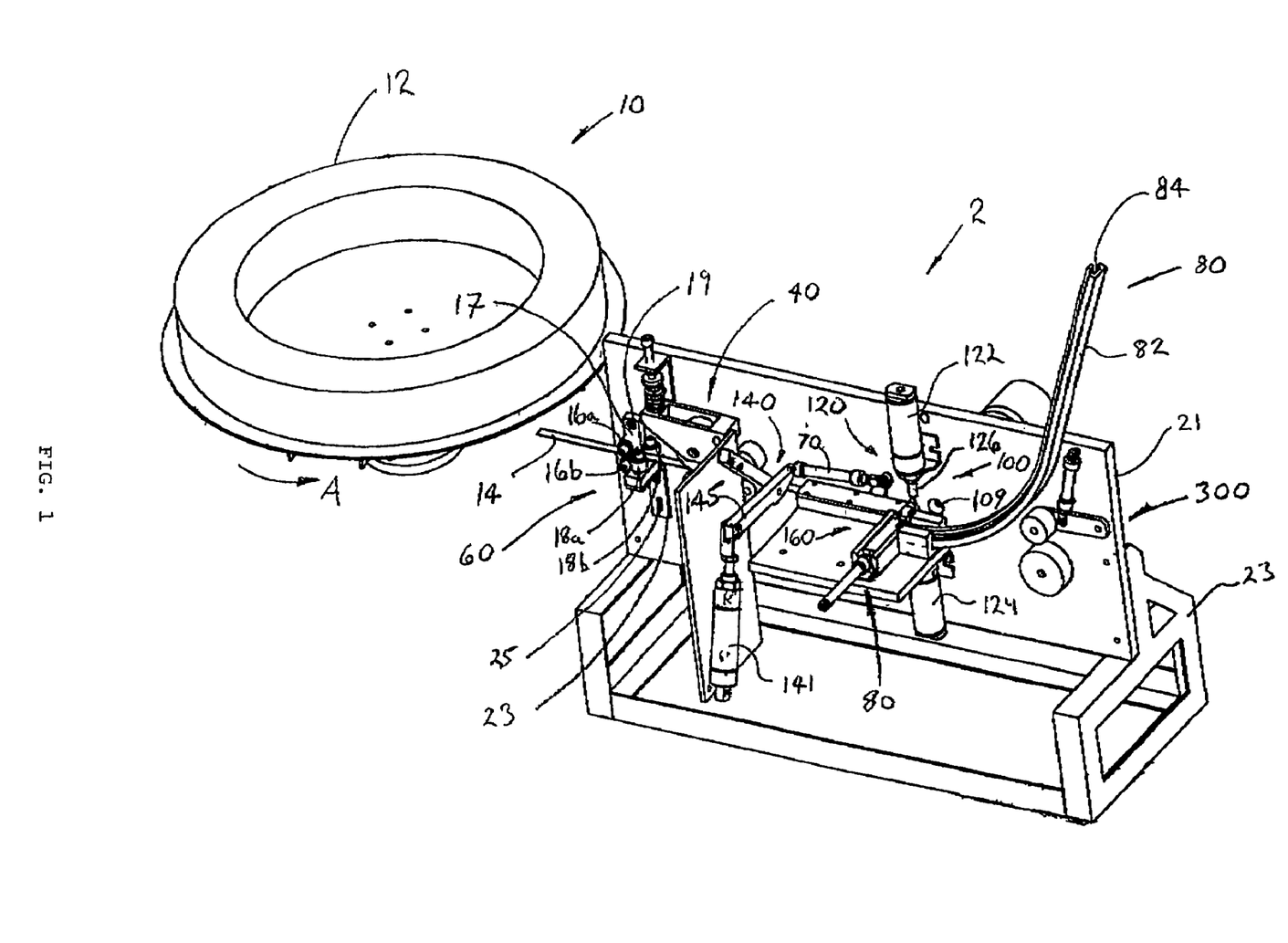
FIG. 1 is a perspective view of the banding device according to the invention.
Figure 2:
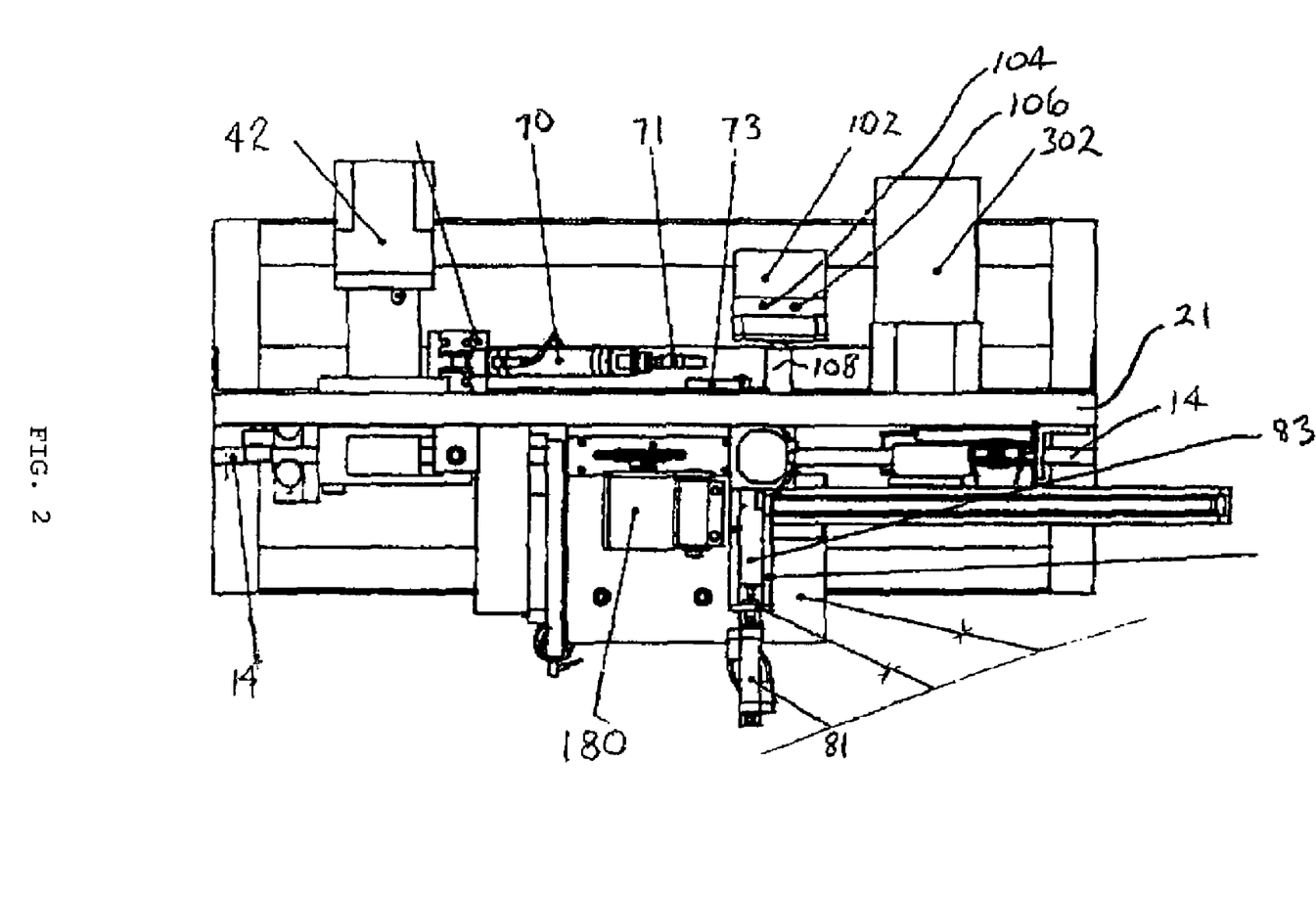
FIG. 2 is a top view of the banding device according to the invention.
Figure 3:
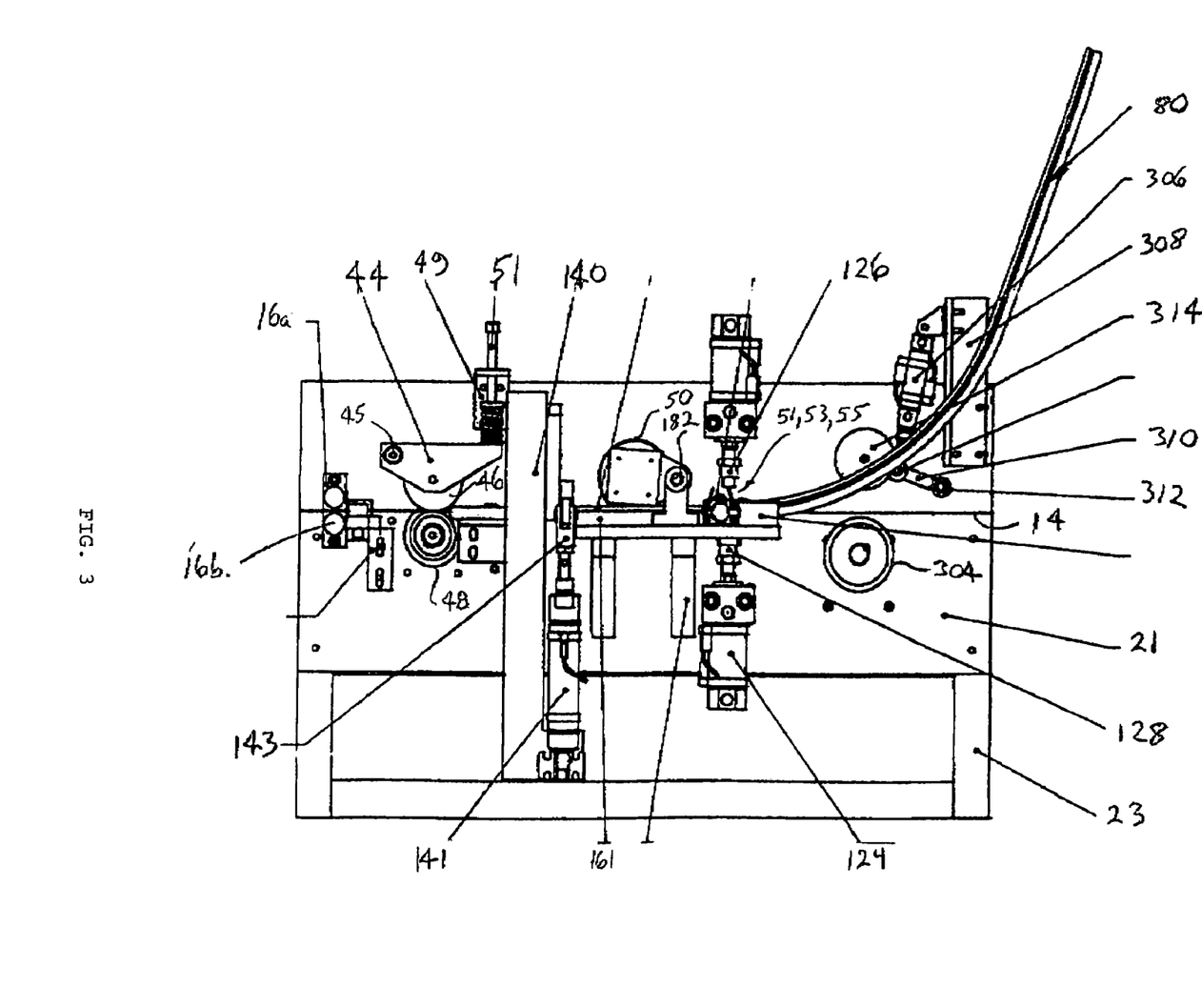
FIG. 3 is a front view of the banding device according to the invention.

There is provided an apparatus for attaching a fastener or wing type seal, or "clip" to a band of desired length. As shown in FIGS. 1-3, the apparatus 2 includes a housing, source material retaining means 10, band feeding means 40, band end alignment means 60, clip positioning means 80, band bending means 100, band and clip crimping or compressing means 120, band cutting means 140, protective guard means and control system means.

Moreover vertical plate 21 is attached to a frame structure 23 to support the device 2 either on the ground, back of a truck or the like.

The source material retaining means 10 may be a spool 12 or other portable means. In other words, the spool carries the band or strap 14 which is unwound from the spool 12 to the apparatus 2. The band alignment means 60 may be pairs or rollers 16a, 16b and 18a, 18b. More particularly the first pair of rollers 16a, 16b align the strap 14 between the rollers 16a, 16b relative to the apparatus 2 while the second pair of spaced apart rollers 18a, 18b align the strap 14 horizontally between the rollers 18a, 18b relative the apparatus 2.

The infeed includes a beveller to avoid misfeeding of the band when the band has a small radius near the end of a coil. In one embodiment the beveller comprises the generally V-shaped opening defined by opposed rollers 16a, 16b best seen in FIG. 3 to assist in receiving the band 14 therebetween. Also, the rollers 16a, 16b are carried by plate 17 which is fastened to vertical plate 21 by fastening means 19 which can consist of a bolt in a manner well known to those skilled in the art. Also the rollers 18a, 18b are carried by plate 23 which is fastened to vertical plate 21 by fastening means 25 which can consist of a bolt. Furthermore the plates 17 and 23 can include slots to permit vertical and horizontal alignment of the rollers relative the strap 14.

Figure 4:
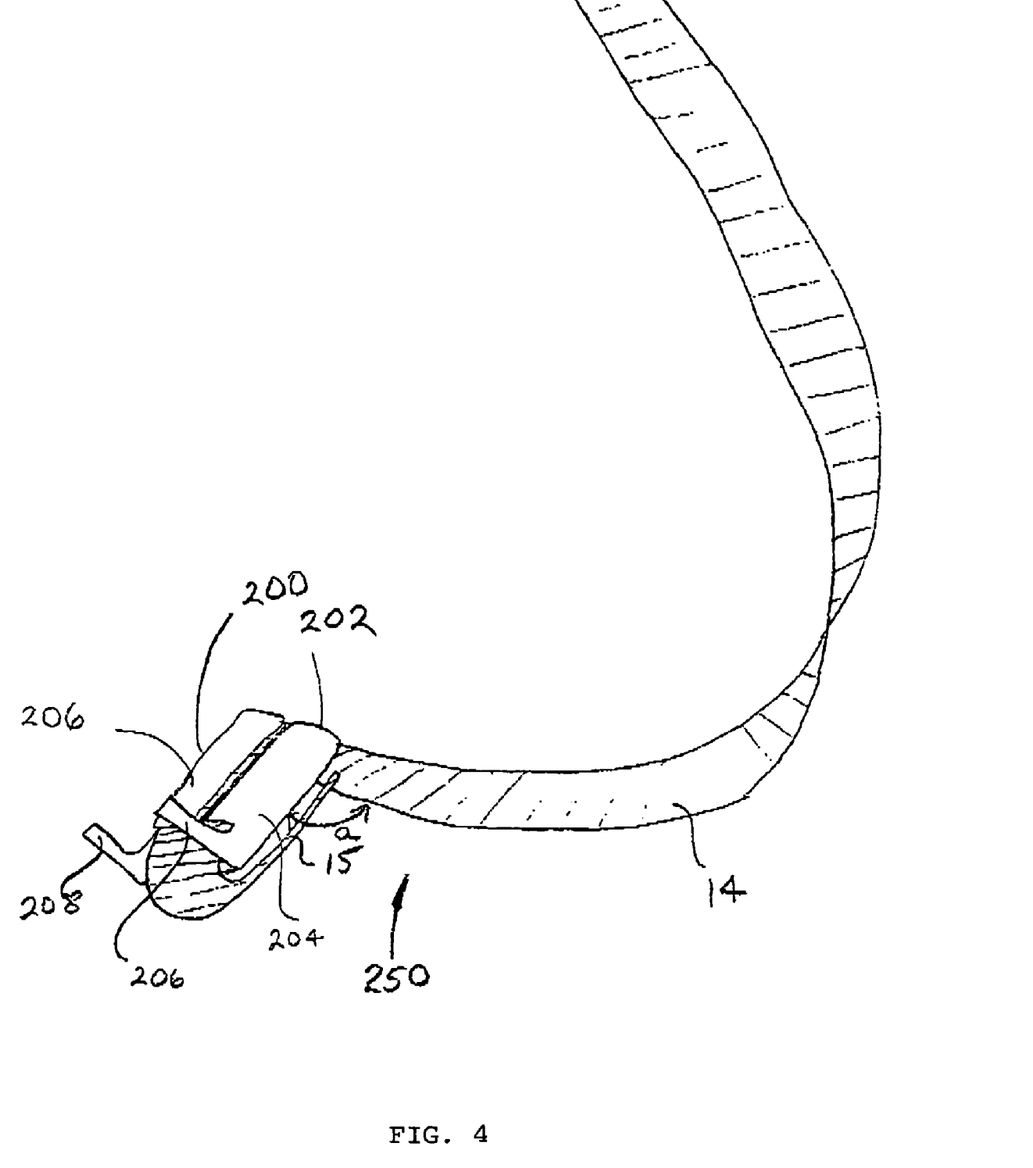
FIG. 4 is a perspective view of the clipped band according to the invention.
Figure 5:
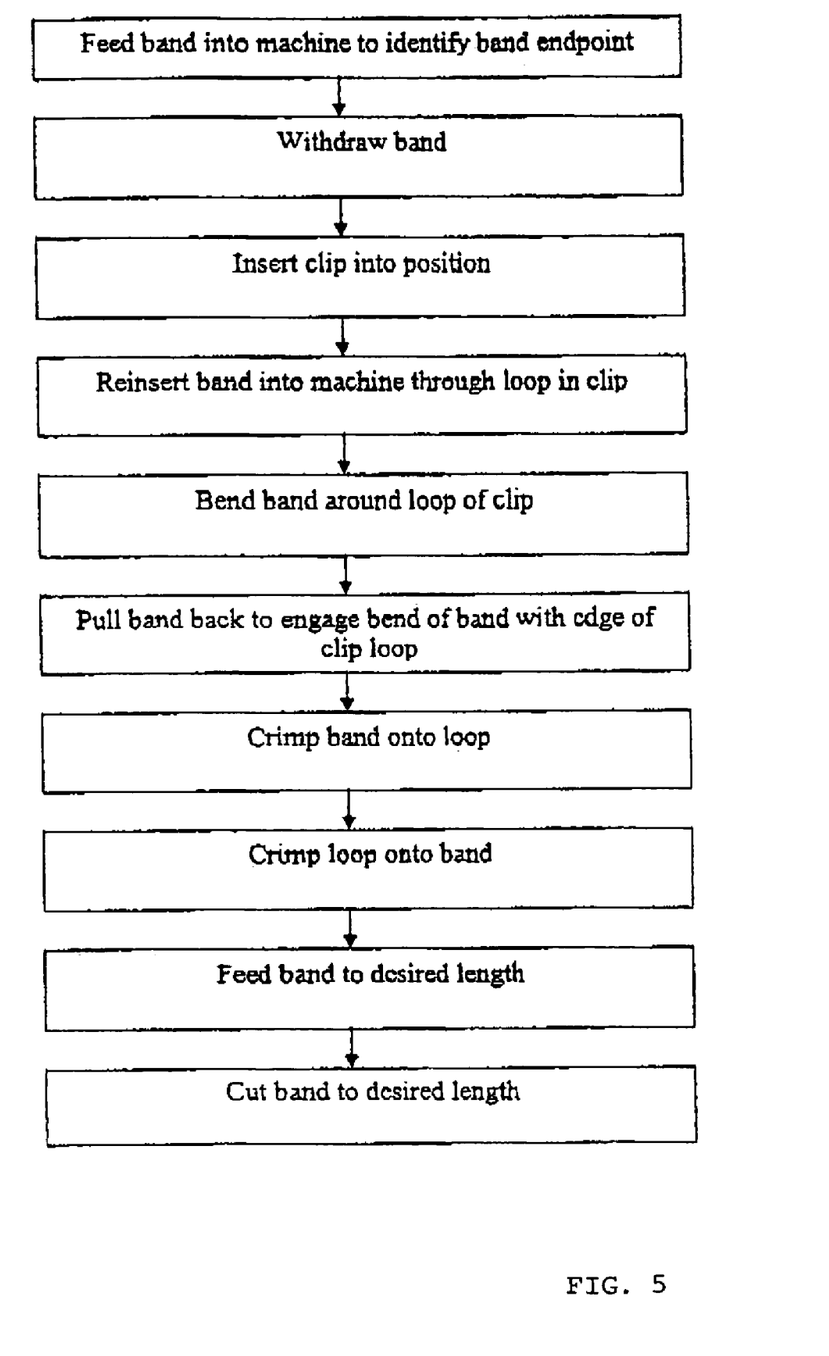
FIG. 5 depicts the steps involved in the method the invention.
Figure 6:
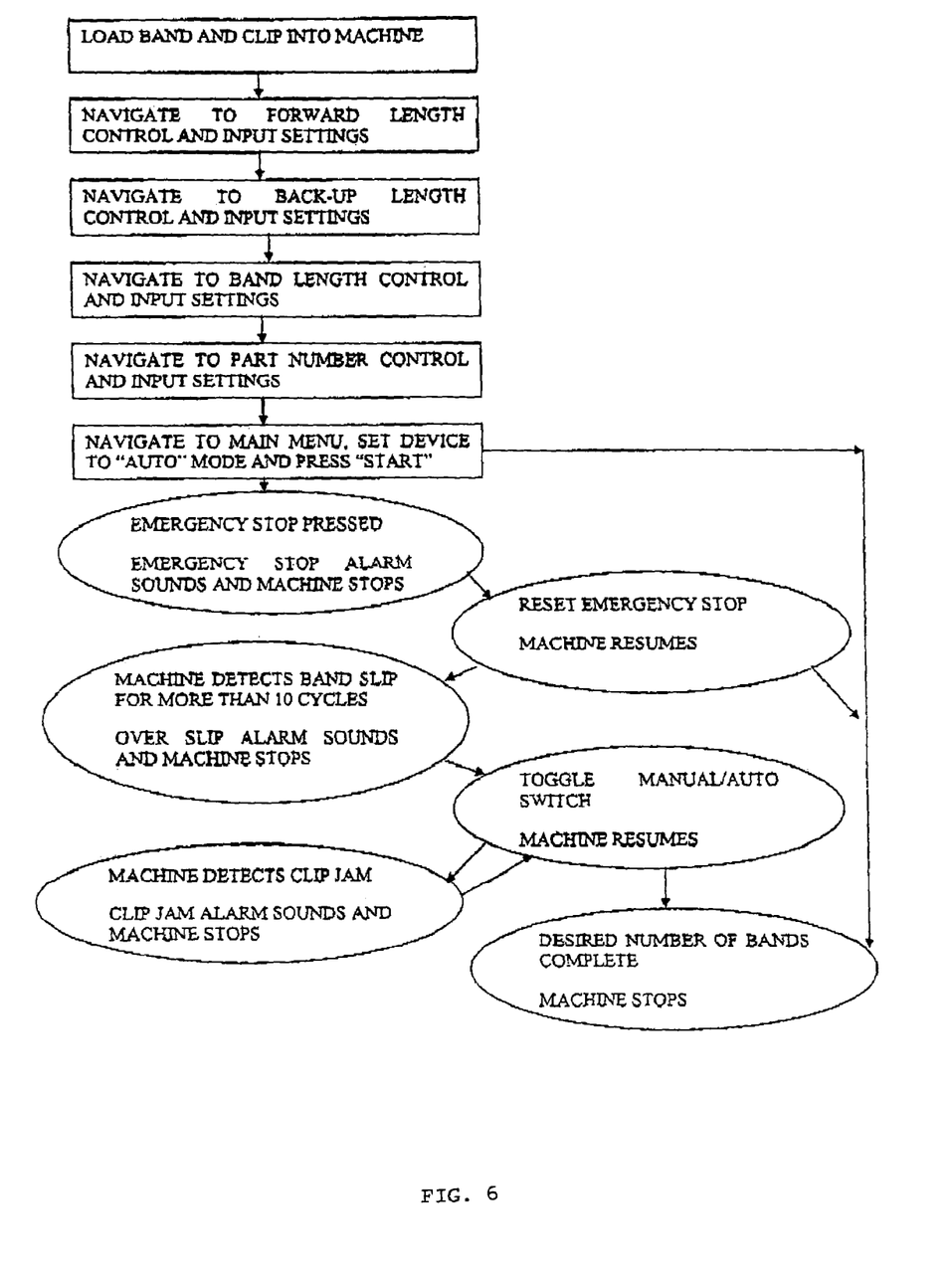
FIG. 6 is a schematic of the alarms of the control system, according to the invention.

Preferably, the band material 14 is stainless steel strapping, although other metals are possible such as aluminum. The wing type seals, or clips 200 as seen in FIG. 4 are also preferably of stainless steel, although other material such as aluminum are possible. Furthermore the configuration of the clip can vary.

The band feeding means 40 include a stepper motor 42 carried by the vertical plate 21. The stepper motor 42 is connected to wheel assembly 44 which can include urethane wheels 46 and 48 to reduce slippage. Urethane wheels 46 and 48 pinch and drive the strap 14 therebetween. More specifically wheel 46 is carried by wheel assembly 44 which pivots about one end 45, and is adapted to be pushed or urged towards wheel 48 at the other end thereof by a spring assembly 49 carried by rod 51. The spring assembly 49 can be located at either end of the wheel assembly 44 as seen in FIGS. 1 and 3.

A passive encoder 180 is provided to measure the desired band length. More particularly the encoder 180 includes an endless track or wheel 50 which contacts the strap 14 and moves as the strap moves to track and control the movement of strap 14. The encoder 180 pivots about point 182 and includes means (not shown) such as a spring so that wheel 50 contacts and moves with the strap 14. The encoder may include a programmable controller such as a microchip or the like, for programming to be described herein. However, in one embodiment the encoder can be connected to a remote controller where the length of the strap and number of straps to be cut can be programmed.

The clip positioning means 80 can comprise of a track or slider 82 which includes a channel 84 having a cross-section to accommodate a clip 200. Furthermore the clip positioning means can include vibrators 51 to position the clips, and brushes 53 to stabilize the clips, as well as a photo-eye 55 to detect poor positioning.

As shown in FIG. 4, the resulting product 250 from the apparatus 2 and method of the invention is a metal band 14 having a sealable clip 200 at one end. The clip by itself is formed of a unitary member having a substantially flat back 202 having two sides folded over to present fold members 204 and 206 and spaced wings 208 and 210, all in a manner well known to those persons skilled in the art. In other words clip 200 is a stock item.

The apparatus 2 is equipped with several alarm systems to detect problems during operation. An emergency stop button may be pressed to stop the apparatus. Upon reset of an emergency stop, a clearing emergency stop alarm is activated for five seconds before operations resume. On occasion, a band may slip in the apparatus. If slippage occurs for more than ten cycles of the apparatus, an over slip detection alarm is activated. On occasion, clips in the clip dispenser 80 will become jammed. If there is a clip jam which cannot be cleared by the apparatus in ten attempts, a clip jam alarm is activated. The over slip jam and clip jam alarms are deactivated by toggling the manual/automatic switch between automatic and manual.

The apparatus may be operated in manual mode or automatic mode. The encoder 180 is programmed to cut the straps 14 to a pre-selected length as well as the number of products 250 that are needed.

When the apparatus 2 is operating the strap 14 is unwound from spool 12 and inserted between the rollers 16a, 16b, 18a, and 18b of the band alignment means 60 and drawn towards the band feeding means 40. In particular the stepper motor 42 will drive wheel 46. Since the drive wheel 46 is urged against the idler wheel 48 the strap 14 will move in the direction of encoder 180 towards the strap holder 161. The photo eye 55 detects the end of the strap 14 and sends a signal to the encoder 180 to stop the stepper motor 42. Thereafter the encoder 180 by means of the endless track 50 retracts the strap 14 slightly so as to permit a clip 200 to be dropped into the proper position in a manner to be described herein.

In particular the clips 200 are inserted into the channel 84 of clip positioning means 80.

Once the band is retracted the clip positioning means 80 which can consist of a hydraulic or pneumatic cylinder 81 activates or pushes a slider 83 so as to push one clip 200 from the track 82 to be in line with the path advancement of the strap 14. Thereafter the encoder causes the endless track 50 to feed the strap 14 through the clip 200, i.e. "thread the needle". The strap 14 extends a predetermined distance beyond the clip, then bent back upon itself. In particular the strap 14 can be bent upon itself over the clip by bending means 100.

In one example the band bending means 100 can consist of a pneumatic cylinder 102 having an inlet and outlet 104 and 106 which will cause the rotation of a slotted sleeve 108. More particularly the slotted sleeve 108 is adapted to extend through a hole 109 so as to dispose the slotted cylinder 108 in the path of strap 14. In other words the strap 14 is capable of extending through the slots of the cylinder 108 so as, to permit the strap 14 to extend beyond the clip as previously described. Thereafter the pneumatic cylinder 102 can be activated by either the encoder 180 or control means previously described so as to cause the slotted cylinder 108 to rotate counter clockwise with respect to FIG. 1. Such counter clockwise rotation is controlled and bends the end of the strap which is treaded through the clip 200 about itself. Thereafter the encoder activates the track 82 so that the bent strap is pulled back through the clip 200.

Thereafter the crimping or compressing or flattening means 120 are activated.

In particular the crimping, compressing, flattening means can comprise of opposed cylinders 122 and 124 which are activated so as to have heads 126 and 128 move towards each other so as to crimp, compress or flatten the bent end of the strap towards the strap so as to "capture" the clip 200 at one end of the strap 14 as shown in FIG. 4. In other words, at least one of the heads 126 and 128 squeezes the folded over strap portion 15 towards the clip 200. This squeezing on compressing may take the form or flattening the parts together or crimping where the material is deformed in a wavy pattern.

After the cylinders 122 and 124 compress the folded over portion of the strap 15 towards the strap portions 204 and 206 the end of the strap 14 will be generally in line with the opening in the strap defined by the back of the strap 202 and folded over portions 204 and 206.

The invention described herein may also include the operation of bending the clip 200 relative the strap 14 at a selected angle "a" so as to minimize the possibility of the clip 200 from sliding down along strap 14 away from the bent portion 15. This can be accomplished by a number of means including the cylinder 70 which can activate the cylinder end 71 so as to move linkages 73 to bend the clip 200 and folded over portion 15 at a selected angle "a" relative to the length of the strap 14. The cylinder 70 may in one embodiment be located behind the vertical plate 21 or in another embodiment shown in FIG. 1 can be located in front of the vertical plate 21.

Moreover vertical plate 21 is attached to a frame structure 23 to support the device 2 either on the ground, back of a truck or the like.

Thereafter the encoder 180 will cause the endless track 50 to move so as to pull the strap 14 through the device so as to pull the strap 14 to the right as shown in FIG. 1. The strap with the clip is pulled to the right a selected distance and then sheared by the band cutting means 140. In particular the band cutting means can comprise of a variety of means including the cylinder 141 which when activated moves the cylinder head 143. The cylinder 143 is connected to one end of cutting means 145. The cutting means 145 can comprise of shears as shown in FIG. 1. The cutting means can have one shear element which is stationary and another element which is moveable by the cylinder 141 so as to cut through the strap 14.

Thereafter the cut strap 14 with the bent clip 200 can be pulled through the device 2 by means of exiting means 300. The exiting means can comprise of a motor 302 which rotates a spinning wheel 304.

Once the encoder 180 and/or control means (not shown) receives a signal that the strap 18 is cut, a cylinder 306 which is attached at one end to a bracket 308 is activated so at to push a lever arm 310 which pivots about point 312 so as to cause the idler wheel 314 to contact the strap 14 which will then be pinched between the idler wheel 314 and spinning wheel 304 so as to "shoot" the cut strap out of the device 2.

According to the method of the invention, the apparatus is prepared by ensuring sufficient band material is available on the source material retaining means, and ensuring the clip dispenser is loaded with clips. The operator selects the desired-Forward Length Control setting, Back-up Length Control setting and Band Length Control setting. The operator then sets the Part Number Control to the desired number of bands to be produced. The operator next starts the apparatus and clipped bands are produced. Once in the operation, the apparatus may be stopped at anytime and when restarted, will resume the run which was interrupted.

A length of band fed into the apparatus and the position of the end of the band is located. The band is retracted slightly and a clip is dropped into position. The band is fed through the clip and a portion of the band extending beyond the clip is bent back upon itself. The band is retracted until the inner surface of the bend of the band comes into contact with the edge of the clip, whereupon the bent band is crimped about the clip. The clip is then crimped or flattened or pressed about the band. The desired length of the band is next fed off the source material coil, severed at the desired length and ejected from the apparatus. The process then repeats to produce the next clipped band.

In operation, the terminus of the metal band is bent back over a wing type seal clip before the band and the clip are crimped to firmly attach to one another.

Various embodiments of the invention have now been described in detail. Since changes in and/or additions to the above-described best mode may be made without departing from the nature, spirit or scope of the invention, the invention is not, to be limited to said details.

I claim:

1. A method of manufacturing a band of a selected length with a fastener at one end thereof comprising: (a) moving said band in a machine along a path; (b) positioning the fastener at a fixed position in said path so that said band has one end extending past said fastener; (c) bending said one end of said band around said fastener; (d) fixing said fastener to the band; (e) cutting a desired length of said band.

2. A method as claimed in claim 1 including stopping movement of said band for placement of said fastener relative said band using a stopping means.

3. A method as claimed claim 2 wherein said fastener is comprised of a clip having a channel therethrough and wherein said band is aligned and moved through said channel so as to present one end of said band extending therethrough.

4. A method as claimed in claim 3 including rotating means engageable with said extended end of said band to bend said extended end of said band about said fastener.

5. A method as claimed in claim 4 including crimping said one bent end of said band and said fastener together.

6. A method as claimed in claim 5 including bending said crimped fastener.

7. A method of producing a band with a clip comprising the steps of:
    (a) unwinding one end of the band from a spool;
    (b) moving the one end of the band through a machine along a path in a first direction;
    (c) positioning the clip at a fixed position along the path so that the one end of the band engages and extends beyond the clip;
    (d) bending the one end of the band around the clip;
    (e) crimping the clip to the band;
    (f) cutting the band to a selected length.

8. A method as claimed in claim 7 including stopping the band at a selected position so that the clip can be positioned into the path.

9. A method as claimed in claim 8 including an encoder sensing the position of the band at the selected position and stopping the movement of the band through the machine along the path.

10. A method as claimed in claim 9 wherein the clip is positioned by a pneumatic cylinder that moves the clip so as to position the clip ahead of the one end of the band along the path.

11. A method as claimed in claim 10 wherein the one end of the band is bent upon itself by a rotating slotted cylinder.

12. A method as claimed in claim 11 wherein the clip is stationary when positioned in the path and the band moves in a second direction opposite the first direction so that the one end of the band bent upon itself engages the clip.

13. A method as claimed in claim 12 wherein the one end of the band bent upon itself is crimped to the clip.

14. A method as claimed in claim 13 wherein the clip comprises a loop having two wings and the one end of the band extends through the loop.

15. A method as claimed in claim 14 including an encoder sensing the length of the band so as to activate cutting means to cut the band to the selected length.

16. A method as claimed in claim 15 wherein the one end of the band is bent relative the length of the bend to inhibit the crimped clip from sliding along the band.

17. A method as claimed in claim 16 wherein another end of the cut length of band is engageable with the clip at the one end.

18. A method as claimed in claim 7 wherein the end of the band is located by sensing means, stopping the movement of the band at a selected position, and the one end of the band retracted in a second direction opposite to the first direction to permit positioning of the clip into the path.

19. A method as claimed in claim 18 wherein the band is moved by a stepper motor.

* * * * *